United States Patent
Sambangi et al.

(10) Patent No.: US 12,462,032 B2
(45) Date of Patent: Nov. 4, 2025

(54) SYSTEMS AND METHODS FOR IMPROVING SECURITY IN UNIVERSAL FLASH DEVICES REGARDING PURGE OPERATIONS

(71) Applicant: QUALCOMM INCORPORATED, San Diego, CA (US)

(72) Inventors: Vamsi Krishna Sambangi, Vizianagaram (IN); Sai Naresh Gajapaka, Hyderabad (IN); Santhosh Reddy Akavaram, Hyderabad (IN); Venkatesha M Iyengar, Bengaluru (IN)

(73) Assignee: Qualcomm Incorporated, San Diego, CA (US)

( * ) Notice: Subject to any disclaimer, the term of this patent is extended or adjusted under 35 U.S.C. 154(b) by 186 days.

(21) Appl. No.: 18/468,466

(22) Filed: Sep. 15, 2023

(65) Prior Publication Data

US 2025/0094584 A1    Mar. 20, 2025

(51) Int. Cl.
*G06F 21/56*    (2013.01)
*G06F 3/06*     (2006.01)
*G06F 21/79*    (2013.01)

(52) U.S. Cl.
CPC .......... *G06F 21/566* (2013.01); *G06F 3/0623* (2013.01); *G06F 3/0659* (2013.01);
(Continued)

(58) Field of Classification Search
CPC ........ G06F 21/56; G06F 21/566; G06F 21/79; G06F 3/06; G06F 3/0623; G06F 3/0659; G06F 3/0679
See application file for complete search history.

(56) References Cited

U.S. PATENT DOCUMENTS 11,275,527 B1 *   3/2022  Spector .............. G06F 13/1642
2009/0259808 A1 * 10/2009  Koren ................. G11C 16/102
                                                        365/185.11
(Continued)

OTHER PUBLICATIONS

"JEDEC Publishes Update to Universal Flash Storage (UFS) Standard"—JEDEC, Jan. 30, 2020 https://www.jedec.org/news/pressreleases/jedec-publishes-update-universal-flash-storage-ufs-standard (Year: 2020).*

(Continued)

*Primary Examiner* — Randy A Scott
(74) *Attorney, Agent, or Firm* — Smith, Tempel, Blaha LLC

(57) ABSTRACT

Systems and methods for improving security of a Universal Flash Storage (UFS) device during a purge operation. If a purge operation being performed in the UFS device is interrupted prematurely, due to issuance of one or more urgent commands, the UFS device notifies the host processor that the purge operation has been interrupted. After the host processor performs the urgent command(s), it causes the UFS device to resume performance of the purge operation and the host processor delays performance of any other commands that arrive at the command queue (CQ) of the host processor until the resumed purge operation has been completed. Because the purge operation is resumed and completed before the host processor performs any of the other command(s) that have arrived at the CQ, die-level attacks seeking to access unpurged data by sending read commands to the CQ of the host processor are thwarted.

24 Claims, 5 Drawing Sheets

(52) U.S. Cl.
    CPC ............ *G06F 3/0679* (2013.01); *G06F 21/79* (2013.01); *G06F 2221/034* (2013.01)

(56) References Cited

U.S. PATENT DOCUMENTS

2022/0164487 A1* 5/2022 Gyllenskog ........... H04L 9/0891
2022/0179587 A1* 6/2022 Spector ................. G06F 3/0658

OTHER PUBLICATIONS

"Universal Flash Storage (UFS 2.1) Datasheet v1.2"—Kingston Digital, Inc., 2021 https://media.digikey.com/pdf/Data%20Sheets/Kingston%20Technology%20PDFs/UFS32G-TXA7-GA20.pdf (Year: 2021).*

Related PCT Patent Application Serial No. PCT/US2024/040458, Filed on Jul. 31, 2024 claiming priority to current application, entitled, "Systems and Methods for Improving Security in Universal Flash Devices Regarding Purge Operations," International Search Report and Written Opinion issued by EPO acting as ISA, report dated Oct. 22, 2024, 8 Pages.

Anonymous: "Universal Flash Storage (UFS), Version 3.1," JDEC Standard. JDEC—JDEC Solid State Technology Association; JESD220E—Jan. 1, 2020, pp. 1-421, XP009541917, from: URL: https://www.jedec.org/standards-documents/docs/jesd220e.

* cited by examiner

SYSTEMS AND METHODS FOR IMPROVING SECURITY IN UNIVERSAL FLASH DEVICES REGARDING PURGE OPERATIONS

DESCRIPTION OF THE RELATED ART

A computing device may include multiple processor-based subsystems. Such a computing device may be, for example, a portable computing device ("PCD"), such as a laptop or palmtop computer, a cellular telephone or smartphone, a portable digital assistant, a portable game console, etc. Still other types of PCDs may be included in automotive and Internet-of-Things ("IoT") applications. A computing device may also be a stationary computer, such as a personal computer (PC) or various types of desktop computers or workstation computers.

Such processor-based subsystems may be included within the same integrated circuit chip or in different chips. A "system-on-a-chip", or "SoC", is an example of one such chip that integrates numerous subsystems to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other subsystems, such as a transceiver or "modem" subsystem that provides wireless connectivity, a memory subsystem, etc.

Computing devices also include various types of memory devices that are used by the processing units for storing data and computer instructions, including Universal Flash Storage (UFS) devices, for example. The Joint Electron Device Engineering Council (JEDEC) UFS 4.0 standard was developed for mobile applications and computing systems requiring high performance with low power consumption. The standard introduces significant bandwidth and data protection improvement for UFS devices. Section 12.2.2.4 of the JEDEC UFS 4.0 standard states that a purge operation shall be performed on physical blocks that are not being used to store logical block data (e.g., physical blocks previously used to store logical block data). A purge operation results in the data stored in the corresponding physical blocks being permanently deleted. The purge operation is intended to protect against die-level attacks, such as a bad actor installing an app on a host processor that accesses the UFS device and reads data to which the bad actor should not have access.

According to this standard, a purge operation can be performed if an fPurgeEnable flag is set to 1 (i.e., purge enabled) and cannot be performed if the fPurgeEnable flag is set to 0 (i.e., purge disabled). The purge operation is initiated by the host processor. The fPurgeEnable flag can only be set to 1 (i.e., purge enabled) if the command queue of the host processor is empty for all logical units (LUNs) of the UFS device. If a purge operation is in progress, a purge status attribute, bPurgeStatus, is set to 01h by the UFS device. If a purge operation is in progress (bPurgeStatus=01h), commands sent to any LUNs of the UFS device or to the replay protected memory block (RPMB) well known LUNs of the UFS device will fail. In such cases, the UFS device returns a sense key "NOT READY" to the host processor to indicate to it that the command failed because a purge operation was in progress. Descriptors, attributes and flags may be read when a purge operation is in progress, but only the fPurgeEnable flag may be written.

A purge operation that is in progress can be interrupted in certain cases. For example, if the UFS device signals to the host processor that the UFS device has immediate need to execute an urgent command or a background operation (an operation corresponding to performance being impacted or critical), the purge operation will be interrupted, or aborted. When the host processor detects a request for executing an urgent command or background operation, it will start executing the urgent command or commands according to the need level. For example, a background operation having an attribute value of 02h indicates that performance is being impacted, whereas a background operation having an attribute value of 03h indicates that performance is critical, and therefore has a higher need level.

The occurrence of a few critical events in the UFS device will also result in a purge operation being interrupted, namely, Dynamic Device Capacity (DYNCAP_NEEDED), Urgent Background Operations (URGENT_BKOPS), Write Booster Flush (WRITEBOOSTER_FLUSH_NEEDED), Temperature Too High (TOO_HIGH_TEMP), Temperature Too Low (TOO_LOW_TEMP), and Performance Throttle (PERFORMANCE_THROTTLING).

If the host processor needs to execute a command urgently (e.g., URGENT_BKOPS, DYNCAP_NEEDED) while a purge operation is in progress, it may interrupt the purge operation. In such cases, the host processor will set the fPurgeEnable flag to zero, wait until the UFS device interrupts the purge operation and notifies the host processor that the purge operation has been interrupted, and then set the bPurgeStatus attribute to 02h to indicate that the purge operation stopped prematurely.

This process of interrupting a purge operation can present problems. One problem is that when the host processor aborts the on-going purge operation, the purge operation is not resumed/retriggered once the urgent command has been served, but rather, any commands that are in the command queue of the host processor will be served. There is currently no mechanism in the standard to retrigger a purge operation that was prematurely aborted. Because the purge operation is not resumed, a die-level attack on the physical blocks of flash memory that were not purged can retrieve all of the unpurged data present in those physical blocks, which defeats the security purpose of the purge operation. Another problem is that the purge operation must be started over from the beginning by the host processor by reinitiating the purge request, which increases latencies.

A need exists for a way to improve UFS security regarding purge operations.

SUMMARY OF THE DISCLOSURE

Systems, methods, and other examples are disclosed for improving security of a UFS device during a purge operation.

An exemplary embodiment of the method comprises:
in the UFS device, if a purge operation in the UFS device is interrupted due to issuance of at least one urgent command, notifying a host processor that the purge operation has been interrupted;
in the host processor, storing the urgent command(s) in a command queue (CQ) and performing the urgent command(s); and
in the host processor, after the urgent command(s) has been performed, causing performance of the purge operation to be resumed in the UFS device.

An exemplary embodiment of the system comprises and UFS device and a host processor. The UFS device comprises control logic configured to output a notification that a purge operation has been interrupted due to issuance of at least one urgent command. The host processor comprises processing logic configured to receive the notification, store the urgent command(s) in the CQ of the host processor, perform urgent command(s), and, after the urgent command(s) has been performed, causing performance of the purge operation to be resumed in the UFS device.

An exemplary embodiment of a computer program embodied on a non-transitory computer-readable medium comprises a first set of computer instructions for execution by control logic of the UFS device and a second set of computer instructions for execution by processing logic of a host processor. The first set of computer instructions outputs a notification from the UFS device that a purge operation has been interrupted due to issuance of at least one urgent command. The second set of computer instructions receives the notification in the host processor, stores the urgent command(s) in the CQ of the host processor, performs the urgent command(s), and, after the urgent command(s) has been performed, causes performance of the purge operation to be resumed in the UFS device.

Another exemplary embodiment of the system comprises means for outputting a notification from a UFS device that a purge operation has been interrupted due to issuance of at least one urgent command, means for receiving the notification in a host processor, means for storing the urgent command(s) in the CQ of the host processor, means for performing said at least one urgent command in the host processor, and means for causing performance of the purge operation to be resumed in the UFS device after said at least one urgent command has been performed.

These and other features and advantages will become apparent from the following description, drawings and claims.

BRIEF DESCRIPTION OF THE DRAWINGS

In the Figures, like reference numerals refer to like parts throughout the various views unless otherwise indicated.

DETAILED DESCRIPTION

Figure 1:
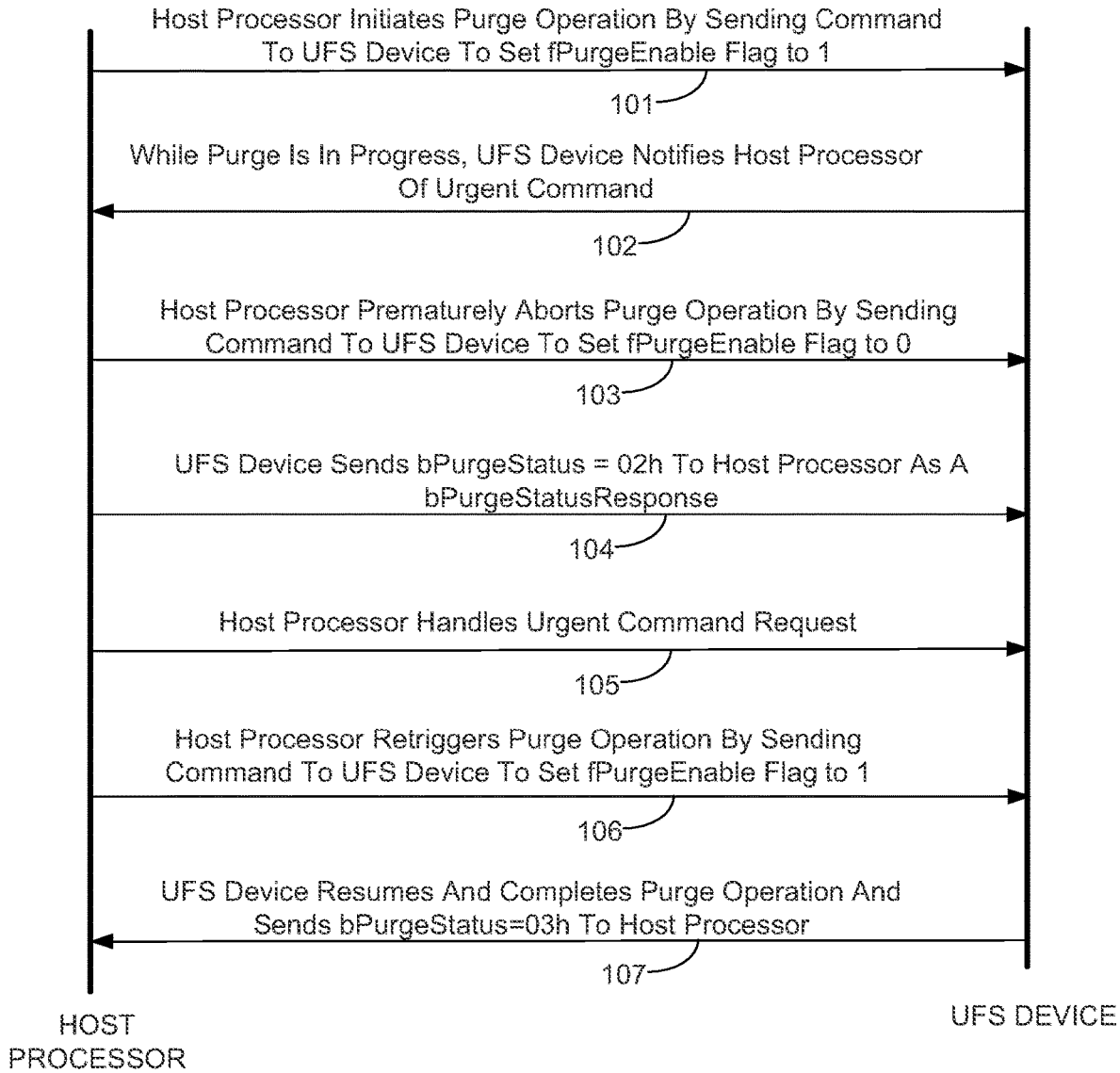
FIG. 1 illustrates a transaction diagram demonstrating the manner in which an interrupted purge operation can be retriggered and resumed to improve security in a UFS device in accordance with a representative embodiment.

The present disclosure discloses systems and methods for improving security in UFS devices regarding purge operations. In accordance with a representative embodiment, if a purge operation being performed in the UFS device is interrupted prematurely due to issuance of one or more urgent commands, the UFS device notifies the host processor that the purge operation has been interrupted. After the host processor performs the urgent command(s), it causes the UFS device to resume performance of the purge operation and the host processor delays performance of any other commands that arrive at the command queue (CQ) of the host processor until the resumed purge operation has been completed. Because the interrupted purge operation is resumed and completed before the host processor performs any of the other command(s) that have arrived at the CQ, die-level attacks seeking to access unpurged data by sending read commands to the CQ of the host processor are thwarted.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The words "illustrative" or "representative" may be used herein synonymously with "exemplary." Any aspect described herein as "exemplary" is not necessarily to be construed as preferred or advantageous over other aspects. However, it will be apparent to one having ordinary skill in the art and having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory device", as that term is used herein, is intended to denote a non-transitory computer-readable storage medium that is capable of storing computer instructions, or computer code, for execution by one or more processors. References herein to a "memory device" should be interpreted as including one or more memory devices.

A "processor", as that term is used herein, encompasses an electronic component that is able to execute a computer program or executable computer instructions. References herein to a computer comprising "a processor" should be interpreted as one or more processors. The processor may for instance be a multi-core processor comprising multiple processing cores, each of which may comprise multiple processing stages of a processing pipeline. A processor may also refer to a collection of processors within a single system or distributed amongst multiple systems.

The term "logic," as that term is used herein, denotes digital circuits, such as digital gate structures, that are combined and configured in a particular manner to achieve one or more particular functions. For example, control logic can be a combination of digital circuits that have been combined and configured in a particular manner to achieve one or more particular control functions, either solely in hardware or in a combination of hardware, software and/or firmware.

A computing device may include multiple subsystems, cores or other components. Such a computing device may be, for example, a PCD, such as a laptop or palmtop computer, a cellular telephone or smartphone, a portable digital assistant, a portable game console, an automotive safety system, etc., or a non-portable computing device (NPCD) such as, for example, a PC, a desktop computer or a workstation computer.

The term "urgent command," as that term is used herein, denotes any event or command for which a purge operation will be aborted, including, but not limited to, background operations that impact or are critical to performance as well as commands that are deemed urgent, such as, for example, Dynamic Device Capacity (DYNCAP_NEEDED), Urgent Background Operations (URGENT_BKOPS), Write Booster Flush (WRITEBOOSTER_FLUSH_NEEDED), Temperature Too High (TOO_HIGH_TEMP), Temperature Too Low (TOO_LOW_TEMP), and Performance Throttle (PERFORMANCE_THROTTLING).

FIG. 1 illustrates a transaction diagram demonstrating the manner in which an interrupted purge operation can be retriggered and resumed to improve security in a UFS device in accordance with a representative embodiment. For demonstrative purposes, the transaction diagram assumes that the transactions are in accordance with the JEDEC UFS 4.0 standard, although the inventive principles and concepts are not limited to this standard. As will be understood by those of skill in the art in view of the description provided herein, standards are frequently updated or replaced, and therefore the inventive principles and concepts disclosed herein apply to providing security to UFS and other flash memory devices regarding purge operations.

In accordance with inventive principles and concepts of the present disclosure, a purge operation that was aborted due to issuance of an urgent command is resumed and completed after the urgent command(s) has been performed by the host processor, but before the host processor performs any other commands (e.g., read and write commands) that arrive at the command queue (CQ) of the host processor during the resumed purge operation. Any other commands that are sent to the CQ during the resumed purge operation are stored in a wait queue (WaitQ) until the resumed purge operation has been completed and then are loaded into the CQ. This additional security eliminates the possibility of a successful die-level attack. For example, a die-level attack can be performed by causing the host processor to run an application program that causes the host processor to issue commands that access data that is stored in the unpurged physical blocks. Because any such commands would not be moved from the WaitQ into the CQ until after completion of the resumed purge operation, the data will have been purged by the time the commands are loaded into the CQ, thereby thwarting the attack.

With reference to FIG. 1, arrow 101 represents the host processor initiating a purge operation by sending a UFS Protocol Information Units (UPIU) command to the UFS device that sets the fPurgeEnable flag equal to 1, which enables the purge operation to be performed. This causes the UFS device to set the bPurgeStatus attribute to 01h, which is communicated to the host processor as a UPIU response to inform it that the purge operation is in progress. In accordance with this transaction example, while the purge operation is in progress, the UFS device notifies the host processor that an urgent command needs to be performed by the host processor, as indicated by arrow 102. As indicated by arrow 103, the host processor then prematurely aborts the purge operation by sending a command to the UFS device to set the fPurgeEnable flag to zero, which disables the purge operation.

The UFS device then sets the bPurgeStatus attribute to 02h to indicate that the purge operation has been aborted prematurely and sends a UPIU bPurgeStatusResponse to the host processor indicating that the bPurgeStatus attribute is 02h, as indicated by arrow 104, to inform the host processor that the purge operation has been aborted. It should be noted that this UPIU bPurgeStatusResponse is a new type of response that is not covered by the JEDEC UFS 4.0 standard. In accordance with this example, reserved bit field 17 of the Transaction Specific Fields for Set Flag Opcode of the standard is used for this purpose, but other bit fields could be used for this purpose.

The host processor then handles the urgent command, which has been loaded into the CQ of the host processor, as indicated by arrow 105. After serving the urgent command, the host processor causes the purge operation to be resumed by sending a UPIU command to the UFS device instructing it to set the fPurgeEnable flag to one to enable the purge operation to be resumed, as indicated by arrow 106.

As indicated above, any commands other than the urgent command that are sent to the CQ of the host processor in between the instant in time when the purge operation is aborted until the instant in time when the resumed purge operation is completed are stored in a waiting queue, WaitQ, and are only loaded into the CQ once the resumed purge operation is completed. Once the resumed purge operation is completed, the UFS device sends a UPIU response to the host processor that bPurgeStatus=03h to indicate that the resumed purge operation has been completed, as indicated by arrow 107. The host processor then loads the commands that are waiting in the WaitQ into the CQ for processing.

Figure 2:
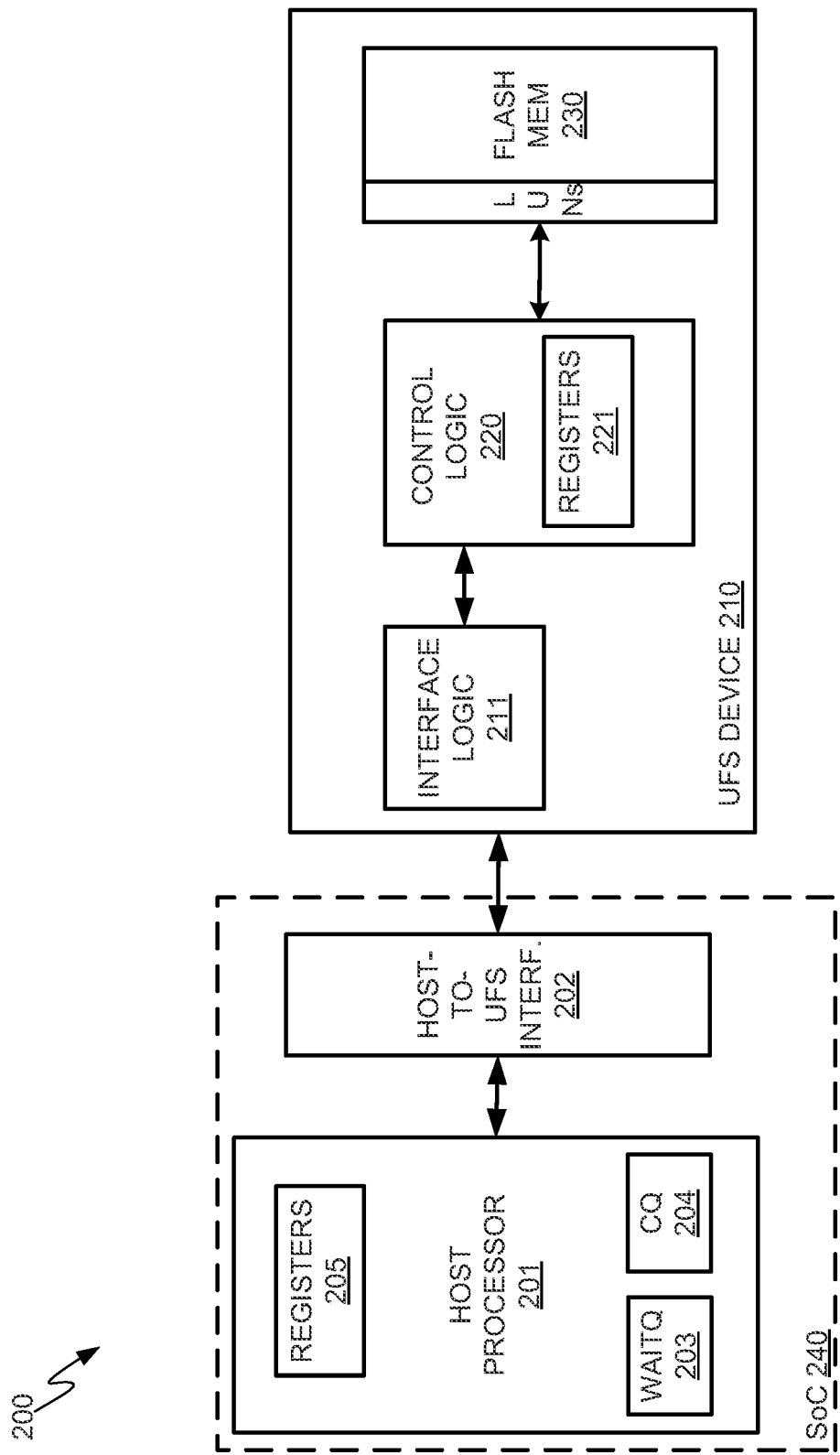
FIG. 2 illustrates a block diagram of the system in accordance with an exemplary embodiment for improving UFS security regarding the performance of purge operations.

FIG. 2 illustrates a block diagram of the system 200 in accordance with an exemplary embodiment for improving UFS security regarding the performance of purge operations. A host processor 201 communicates with a UFS device 210 via a host-to-UFS interface 202 to perform transactions of the type described above with reference to FIG. 1. The host processor 201 comprises logic that is configured to perform the processes described above with reference to FIG. 1 as well as logic that is configured to perform additional processes that are not discussed herein in the interest of brevity. Likewise, the UFS device 210 comprises logic that is configured to perform the processes described above with reference to FIG. 1 as well as logic that is configured to perform additional processes that are not discussed herein in the interest of brevity.

The WaitQ 203 of the host processor 201 stores any commands other than the urgent command(s) that are sent to the CQ 204 of the host processor 201 in between the instant in time when the purge operation is aborted until the instant in time when the resumed purge operation is completed. The urgent command is immediately loaded into the CQ 204 upon issuance of the urgent command. Once the resumed purge operation has been completed, the commands that are stored in the WaitQ 203 are loaded into the CQ 204 for processing. The host processor 201 also comprises one or more registers 205 for holding the current values of the fPurgeEnable flag and the bPurgeStatus attribute. The register(s) 205 can be any suitable memory of the host processor 201.

Interface logic 211 of the UFS device 210 is configured to interface with the host-to-UFS interface 202 and to interface with control logic 220 of the UFS device 210. The control logic 220 is configured to perform the tasks described above with reference to FIG. 1 as well as additional tasks that are beyond the scope of this disclosure and are not discussed herein in the interest of brevity. The control logic 220 also comprises one or more registers 221 for holding the current values of the fPurgeEnable flag and the bPurgeStatus attribute. The register(s) 221 can be any suitable memory of the control logic 220. Flash memory 230 of the UFS device 210 contains physical blocks of flash memory cells that are addressed based on instructions from the control logic 220 to perform write, read, erase and purge operations.

As will be described in more detail below, the host processor 201 and the host-to UFS-interface 202 can be components of an SoC 240, which can be implemented in a PCD, such as a mobile phone, for example. It should be noted, however, that the inventive principles and concepts are not limited to be part of or implemented in any particular device or used for any particular application, as will be understood by those of skill in the art in view of the description provided herein.

Figure 3:
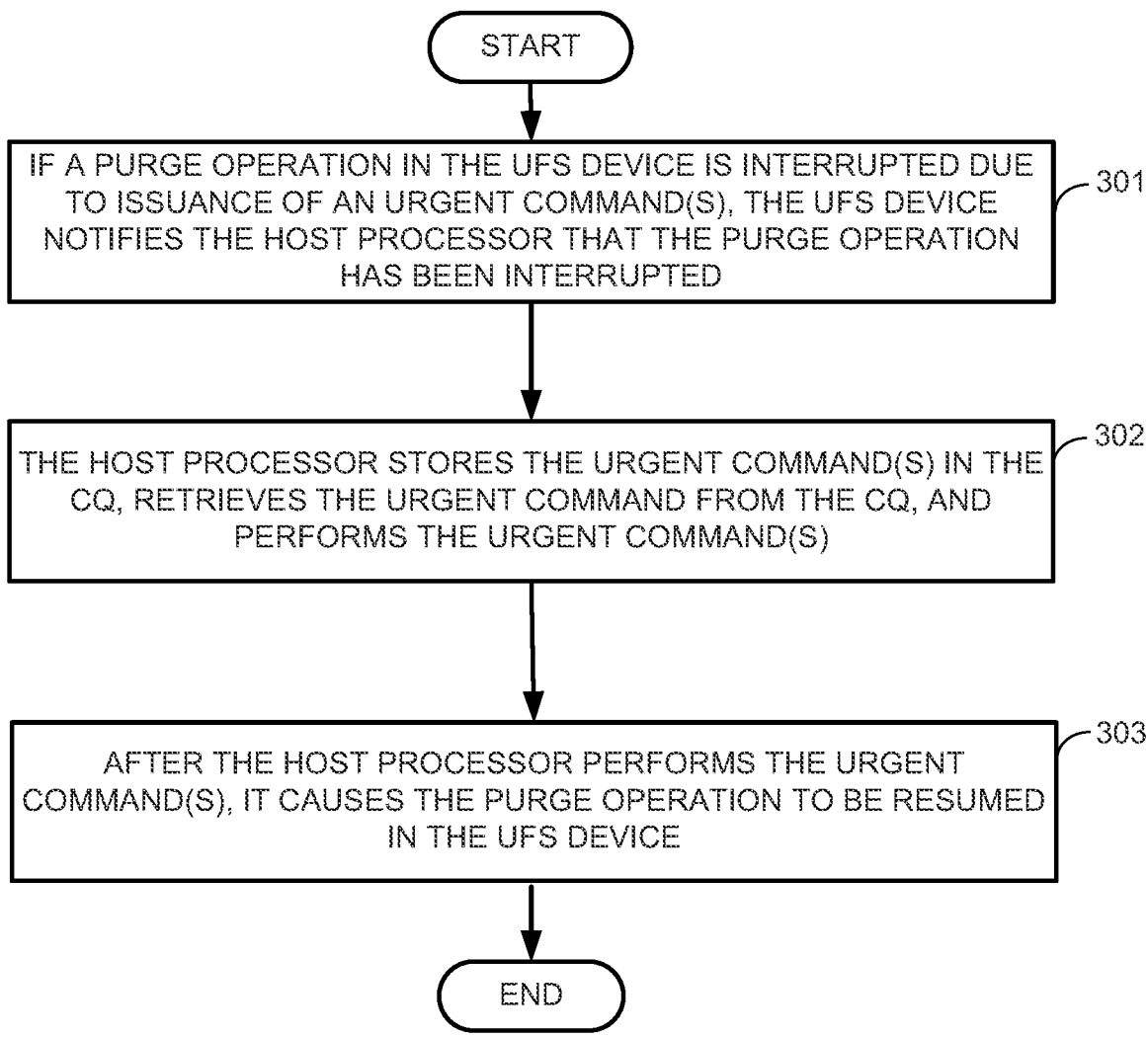
FIG. 3 illustrates a flow diagram of the method in accordance with a representative embodiment for improving security of a UFS device during a purge operation.

FIG. 3 illustrates a flow diagram of the method in accordance with a representative embodiment for improving security of a UFS device during a purge operation. If a purge operation in the UFS device is interrupted due to issuance of at least one urgent command, the UFS device notifies the host processor that the purge operation has been interrupted, as indicated by block 301. The host processor stores the urgent command(s) in the CQ, retrieves the urgent command(s) from the CQ, and performs the urgent command(s), as indicated by block 302. After the urgent command(s) has been performed, the host processor causes performance of the purge operation to be resumed in the UFS device, as indicated by block 303.

Figure 4:
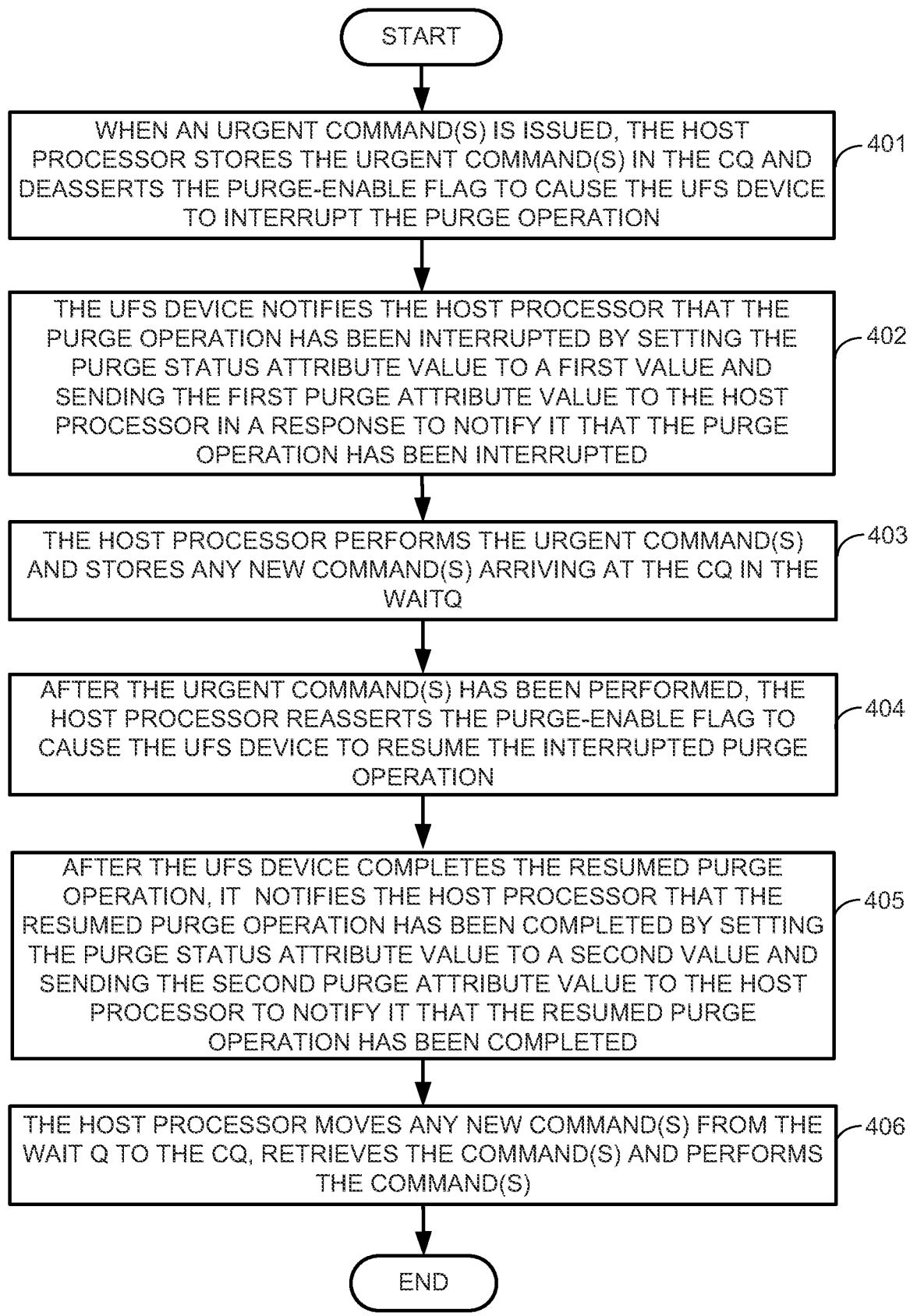
FIG. 4 illustrates a flow diagram of the method represented by the flow diagram of FIG. 3 in accordance with a preferred embodiment in which the steps shown in FIG. 3 are implemented in a particular way within the framework of the JEDEC UFS 4.0 standard.

As will be understood by those of skill in the art in view of the description provided herein, the steps represented by blocks 301-303 of FIG. 3 can be performed in many different ways. FIG. 4 illustrates a flow diagram of the method represented by the flow diagram of FIG. 3 in accordance with a preferred embodiment in which the steps shown in FIG. 3 are implemented in a particular way within the framework of the JEDEC UFS 4.0 standard. It should be noted that the flow diagram of FIG. 4 is an example of one of many ways in which the method can be implemented within the framework of the JEDEC UFS 4.0 standard and that the inventive principles and concepts are not limited to the standard.

Prior to the step of the purge operation being interrupted at block 301 of FIG. 3, when an urgent command(s) is issued, the host processor stores the urgent command(s) in the CQ and sends a command to the UFS device to de-assert a purge-enable flag, as indicated by block 401. As indicated above, in accordance with the JEDEC UFS 4.0 standard, the purge-enable flag is the fPurgeEnable flag. De-assertion of the purge-enable flag causes the UFS device to interrupt the purge operation. The UFS device then notifies the host processor that the purge operation has been interrupted at block 301 by setting a purge status attribute to a first value (e.g., 02h in the standard) and sending the first purge status attribute value to the host processor in a response that notifies the host processor that the purge operation has been interrupted, as indicated by block 402. As indicated above, in the JEDEC UFS 4.0 standard, the purge status attribute is the bPurgeStatus attribute.

While the purge operation is interrupted, the host processor performs the urgent command(s) and causes any new command(s) that arrives at the CQ (i.e., any command(s) other than the urgent command(s)) after the purge operation is interrupted to be stored in the WaitQ, as indicated by block 403. After any urgent command(s) has been performed, the host processor reasserts the purge-enable flag to cause the UFS device to resume the interrupted purge operation, as indicated by block 404. While the resumed purge operation is in progress, the host processor causes any new command(s) that arrive at the CQ to be stored in the WaitQ.

After the resumed operation has been completed, the UFS device sets the purge status attribute to a second value (e.g., 03h in the standard) that indicates that the resumed purge operation has been completed and sends the second purge status attribute value to the host processor to notify the host processor that the resumed purge operation has been completed, as indicated by block 405. After receiving the second purge status attribute value indicating that the resumed purge operation has been completed, the host processor moves any command(s) that is waiting in the WaitQ to the CQ, retrieves the command(s) from the CQ and performs the retrieved command(s), as indicated by block 406. The processes of storing commands sent to the CQ in the WaitQ and of moving commands from the WaitQ to the CQ preferably are implemented in software and/or firmware executed by the host processor, but could also be performed in hardware or in a combination of hardware and software and/or firmware.

Figure 5:
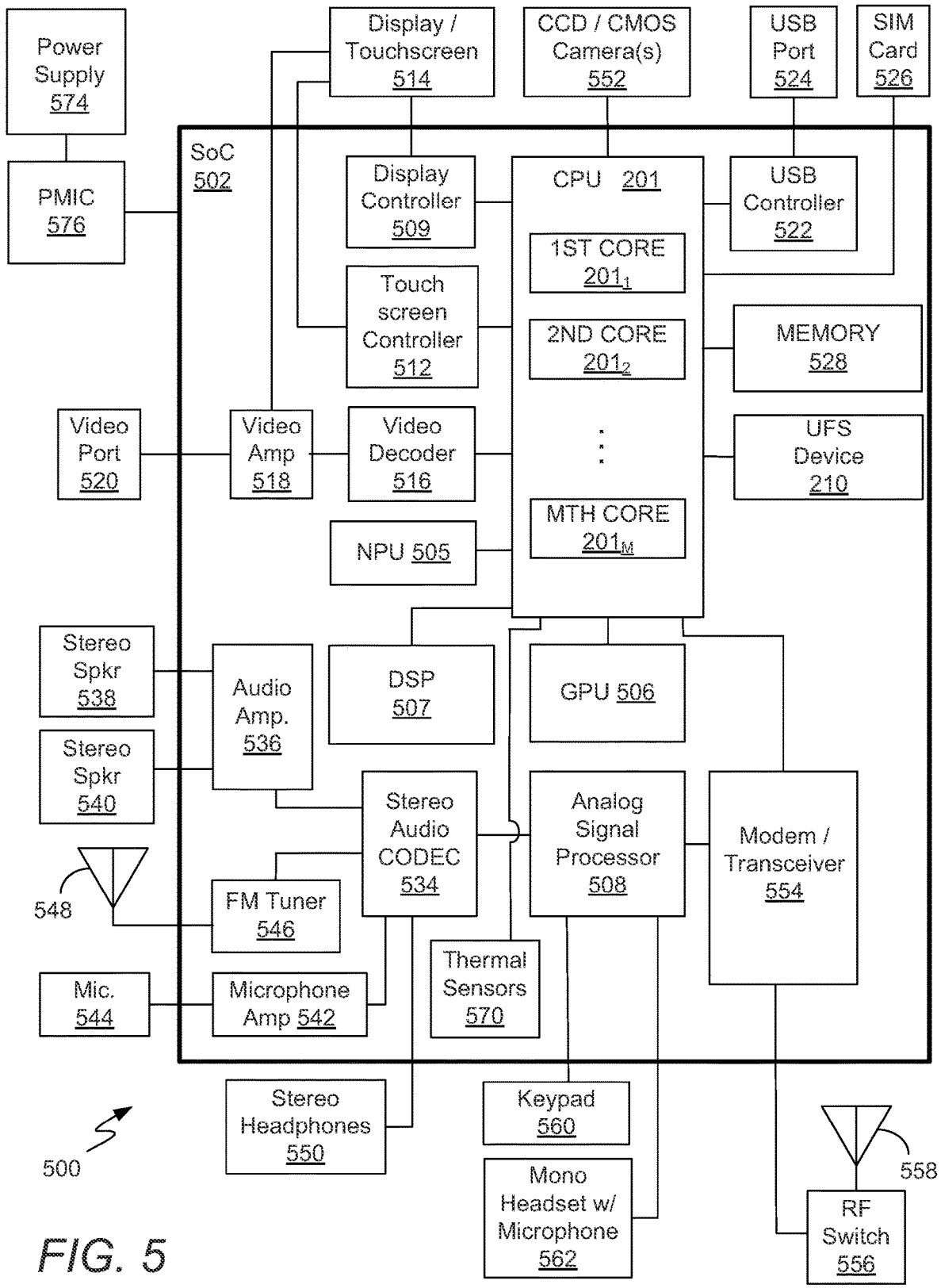
FIG. 5 illustrates an example of a PCD in which exemplary embodiments of systems, methods, computer-readable media, and other examples of the inventive principles and concepts of the present disclosure may be implemented.

FIG. 5 illustrates an example of a PCD 500, such as a mobile phone, a smartphone, a portable game console such as an Extended Reality (XR) device, a Virtual Reality (VR) device, an Augmented Reality (AR) device, or a Mixed Reality (MR) device, etc., in which exemplary embodiments of systems, methods, computer-readable media, and other examples of the inventive principles and concepts of the present disclosure may be implemented. The PCD 500 comprises an SoC 502, which comprises the system 200 shown in FIG. 2 or a similar system for performing the methods described above with reference to FIGS. 1-4. For purposes of clarity, some interconnects, signals, etc., are not shown in FIG. 5. The UFS device 210 is shown in FIG. 5 as being internal to the SoC 502 for ease of illustration, but it could be external to the SoC 502.

The SoC 502 may include a CPU 201, an NPU 505, a GPU 506, a DSP 507, an analog signal processor 508, a modem/transceiver subsystem 554, and/or other processors. Any processor of the SoC 502 can operate as the host processor 201 shown in FIG. 2, but for illustrative purposes the CPU 201 shown in FIG. 5 is assumed to be operating as the host processor 201 shown in FIG. 2. Typically, multiple processors of the SoC 502 will interface with the UFS device 210 and will operate as host processors relative to the UFS device 210. It should be noted that the SoC 502 can comprise multiple UFS devices 210. It should also be noted that the host processor(s) need not be part of an SoC.

The CPU 201 may include one or more CPU cores, such as a first CPU core $201_1$, a second CPU core $201_2$, etc., through an $M^{th}$ CPU core $201_M$. A display controller 509 and a touch-screen controller 512 may be coupled to the CPU 201. A touchscreen display 514 external to the SoC 502 may be coupled to the display controller 509 and the touch-screen controller 512. The PCD 500 may further include a video decoder 516 coupled to the CPU 201. A video amplifier 518 may be coupled to the video decoder 516 and the touchscreen display 514. A video port 520 may be coupled to the video amplifier 518. A universal serial bus ("USB") controller 522 may also be coupled to CPU 501, and a USB port 524 may be coupled to the USB controller 522. A subscriber identity module ("SIM") card 526 may also be coupled to the CPU 201.

One or more memories 528 may be coupled to the CPU 201. The one or more memories 528 may include both volatile and non-volatile memories. Examples of volatile memories include static random access memory ("SRAM"), dynamic random access memory ("DRAM"), double data rate synchronous DRAM (DDR SDRAM), etc. Such memories may be external to the SoC 502 or internal to the SoC 502. The one or more memories 528 may also include local cache memory and/or a system-level cache memory.

A stereo audio CODEC 534 may be coupled to the analog signal processor 508. An audio amplifier 536 may be coupled to the stereo audio CODEC 534. First and second stereo speakers 538 and 540, respectively, may be coupled to the audio amplifier 536. In addition, a microphone amplifier 542 may be coupled to the stereo audio CODEC 534, and a microphone 544 may be coupled to the microphone amplifier 542. A frequency modulation ("FM") radio tuner 546 may be coupled to the stereo audio CODEC 534. An FM antenna 548 may be coupled to the FM radio tuner 546. Further, stereo headphones 550 may be coupled to the stereo audio CODEC 534. Other devices that may be coupled to the CPU 201 include one or more digital (e.g., CCD or CMOS) cameras 552.

The RF modem/transceiver 554 may be coupled to the analog signal processor 508 and the CPU 201. An RF switch 556 may be coupled to the RF modem/transceiver 554 and to an RF antenna 558. A keypad 560 and a mono headset with a microphone 562 may be coupled to the analog signal processor 508. The SoC 502 may have one or more internal or on-chip thermal sensors 570. A power supply 574 and a power management IC (PMIC) 576 may supply power to the SoC 502.

Firmware or software may be stored in any of the above-described memories, or may be stored in a local memory directly accessible by the processor hardware on which the software or firmware executes. Execution of such firmware or software by logic of the UFS device 210 and by the CPU 201 may control aspects of any of the above-described methods or configure aspects of any of the above-described systems. Any such memory or other non-transitory storage medium having firmware and/or software stored therein in computer-readable form for execution by processor hardware may be an example of a "computer-readable medium," as the term is understood in the patent lexicon.

Implementation examples are described in the following numbered clauses:

1. A method for improving security of a Universal Flash Storage (UFS) device during a purge operation that is intended to delete data stored in one or more physical blocks of flash memory of the UFS device, the method comprising:
    in the UFS device, if a purge operation in the UFS device is interrupted due to issuance of at least one urgent command, notifying a host processor that the purge operation has been interrupted;
    in the host processor, storing said at least one urgent command in a command queue (CQ) and performing said at least one urgent command; and
    in the host processor, after said at least one urgent command has been performed, causing performance of the purge operation to be resumed in the UFS device.

2. The method of clause 1, further comprising:
    in the host processor, if one or more new commands other than said at least one urgent command arrive at the CQ after the purge operation is interrupted and before the resumed purge operation has been completed, delaying performance of said one or more new commands until the resumed purge operation has been completed.

3. The method of clause 2, wherein the host processor delays performance of said one or more new commands by storing said one or more new commands in a wait queue (WaitQ) until the resumed purge operation has been completed.

4. The method of clause 3, further comprising:
    in the host processor, after the resumed purge operation has been completed, moving said one or more new commands from the WaitQ to the CQ; and
    in the host processor, retrieving said one or more new commands from the CQ and performing the one or more retrieved new commands.

5. The method of any of clauses 1-4, further comprising:
    in the host processor, prior to purge operation being interrupted sending a command to the UFS device to de-assert a purge-enable flag, wherein de-assertion of the purge-enable flag causes the UFS device to interrupt the purge operation.

6. The method of any of clauses 1-5, wherein the UFS device notifies the host processor that the purge operation has been interrupted by setting a purge status attribute to a first value that indicates that the purge operation has been interrupted and sending the first purge status attribute value to the host processor to inform the host processor that the purge operation has been interrupted.

7. The method of any of clauses 5-6, wherein after said at least one urgent command has been performed, the host processor causes performance of the purge operation to be resumed in the UFS device by sending a command to the UFS device to reassert the purge-enable flag, wherein reassertion of the purge-enable flag causes the UFS device to resume the purge operation.

8. The method of any of clauses 6-7, further comprising:
    in the UFS device, after the resumed operation has been completed, setting the purge status attribute to a second value that indicates that the resumed purge operation has been completed and sending the second purge status attribute value to the host processor to inform the host processor that the resumed purge operation has been completed.

9. The method of clause 8, further comprising:
    in the host processor, after receiving the second purge status attribute value indicating that the resumed purge operation has been completed, moving said one or more new commands from the WaitQ to the CQ, retrieving said one or more new commands from the CQ and performing the one or more retrieved new commands.

10. The method of any of clauses 1-9, wherein the host processor and UFS device are components of a portable computing device.

11. A system for improving security of a Universal Flash Storage (UFS) device during a purge operation that is intended to delete data stored in one or more physical blocks of flash memory of the UFS device, the system comprising:

a UFS device comprising control logic configured to output a notification that a purge operation has been interrupted due to issuance of at least one urgent command;

a host processor comprising processing logic configured to:

receive the notification;

store said at least one urgent command in a command queue (CQ) of the host processor;

perform said at least one urgent command; and after said at least one urgent command has been performed, cause performance of the purge operation to be resumed in the UFS device.

12. The system of clause 11, wherein the processing logic of the host processor is further configured to:

if one or more new commands other than said at least one urgent command arrive at the CQ after the purge operation is interrupted and before the resumed purge operation has been completed, delay performance of said one or more new commands until the resumed purge operation has been completed.

13. The system of clause 12, wherein the processing logic of the host processor delays performance of said one or more new commands by storing said one or more new commands in a wait queue (WaitQ) until the resumed purge operation has been completed.

14. The system of clause 13, wherein the processing logic of the host processor is further configured to:

after the resumed purge operation has been completed, move said one or more new commands from the WaitQ to the CQ;

retrieve said one or more new commands from the CQ; and perform the one or more retrieved new commands.

15. The system of any of clauses 11-14, wherein the processing logic of the host processor is further configured to:

prior to purge operation being interrupted, send a command to the UFS device to de-assert a purge-enable flag, wherein de-assertion of the purge-enable flag causes the UFS device to interrupt the purge operation.

16. The system of any of clauses 11-15, wherein the control logic of UFS device is configured to output the notification to the host processor that the purge operation has been interrupted by setting a purge status attribute to a first value that indicates that the purge operation has been interrupted and by sending the first purge status attribute value to the host processor to inform the host processor that the purge operation has been interrupted.

17. The system of any of clauses 15-16, wherein the processing logic of the host processor is configured to cause performance of the purge operation to be resumed in the UFS device by sending a command to the UFS device to reassert the purge-enable flag, wherein reassertion of the purge-enable flag causes the UFS device to resume the purge operation.

18. The system of any of clauses 16-17, wherein the control logic of the UFS device is further configured to:

after the resumed purge operation has been completed, set the purge status attribute to a second value that indicates that the resumed purge operation has been completed; and send the second purge status attribute value to the host processor to inform the host processor that the resumed purge operation has been completed.

19. The system of clause 18, wherein the processing logic of the host processor is further configured to:

after receiving the second purge status attribute value indicating that the resumed purge operation has been completed, move said one or more new commands from the WaitQ to the CQ, retrieve said one or more new commands from the CQ and perform the one or more retrieved new commands.

20. The system of any of clauses 11-19, wherein the host processor and UFS device are components of a portable computing device.

21. A computer program embodied on a non-transitory computer-readable medium for execution by a processor for improving security of a Universal Flash Storage (UFS) device during a purge operation that is intended to delete data stored in one or more physical blocks of flash memory of the UFS device, the computer program comprising:

a first set of computer instructions for execution by control logic of the UFS device for outputting a notification that a purge operation has been interrupted due to issuance of at least one urgent command; and a second set of computer instructions for execution by processing logic of a host processor for:

receiving the notification;

storing said at least one urgent command in a command queue (CQ) of the host processor;

performing said at least one urgent command; and after said at least one urgent command has been performed, causing performance of the purge operation to be resumed in the UFS device.

22. The computer program of clause 21, further comprising a third set of computer instructions for execution by the processing logic of the host processor for:

if one or more new commands other than said at least one urgent command arrive at the CQ after the purge operation is interrupted and before the resumed purge operation has been completed, delaying performance of said one or more new commands until the resumed purge operation has been completed.

23. The computer program of clause 22, wherein the third set of computer instructions delays performance of said one or more new commands by storing said one or more new commands in a wait queue (WaitQ) until the resumed purge operation has been completed.

24. The computer program of any of clauses 22-23, further comprising a fourth set of computer instructions for execution by the processing logic of the host processor for:

after the resumed purge operation has been completed, moving said one or more new commands from the WaitQ to the CQ;

retrieving said one or more new commands from the CQ; and performing the one or more retrieved new commands.

25. The computer program of clause 24, further comprising a fifth set of computer instructions for execution by the processing logic of the host processor for:

prior to purge operation being interrupted, sending a command to the UFS device to de-assert a purge-enable flag, wherein de-assertion of the purge-enable flag causes the UFS device to interrupt the purge operation.

26. The computer program of any of clauses 21-25, wherein the first set of computer instructions for execution by the control logic of the UFS device outputs the notification to the host processor that the purge operation has been interrupted by setting a purge status attribute to a first value that indicates that the purge operation has been interrupted and by sending the first purge status attribute value to the host processor to inform the host processor that the purge operation has been interrupted.

27. The computer program of any of clauses 21-26, wherein the second set of computer instructions causes performance of the purge operation to be resumed in the UFS device by sending a command to the UFS device to reassert the purge-enable flag, wherein reassertion of the purge-enable flag causes the UFS device to resume the purge operation.

28. The computer program of any of clauses 25-27, further comprising a sixth set of computer instructions for execution by the control logic of the UFS device for:

after the second set of computer instructions has completed the resumed purge operation has been completed, setting the purge status attribute to a second value that indicates that the resumed purge operation has been completed; and sending the second purge status attribute value to the host processor to inform the host processor that the resumed purge operation has been completed.

29. The computer program of clause 28, further comprising a seventh set of computer instructions for execution by the processing logic of the host processor for:

receiving the second purge status attribute value indicating that the resumed purge operation has been completed; and after receiving the second purge status attribute value indicating that the resumed purge operation has been completed, moving said one or more new commands from the WaitQ to the CQ, retrieve said one or more new commands from the CQ and perform the one or more retrieved new commands.

30. A system for improving security of a Universal Flash Storage (UFS) device during a purge operation that is intended to delete data stored in one or more physical blocks of flash memory of the UFS device, the system comprising:

means for outputting a notification from a UFS device that a purge operation has been interrupted due to issuance of at least one urgent command;

means for receiving the notification in a host processor;

means for storing said at least one urgent command in a command queue (CQ) of the host processor;

means for performing said at least one urgent command in the host processor; and means for causing performance of the purge operation to be resumed in the UFS device after said at least one urgent command has been performed.

Alternative embodiments will become apparent to one of ordinary skill in the art to which the invention pertains in view of the present disclosure. Therefore, although selected aspects have been illustrated and described in detail, it will be understood that various substitutions and alterations may be made therein.

What is claimed is:

1. A method for improving security of a Universal Flash Storage (UFS) device during a purge operation that is intended to delete data stored in one or more physical blocks of flash memory of the UFS device, the method comprising:

in the UFS device, if a purge operation in the UFS device is interrupted due to issuance of at least one urgent command, notifying a host processor with a message that the purge operation has been interrupted;

in the host processor, storing said message in one of a plurality of registers and storing said at least one urgent command in a command queue (CQ) that is part of the host processor;

when one or more new commands other than said at least one urgent command arrive at the CQ after the purge operation in the UFS device is interrupted and before the purge operation is resumed, the host processor storing said one or more new commands in a wait queue (WaitQ) that is part of the host processor;

the host processor performing said at least one urgent command;

in the host processor, after said at least one urgent command has been performed, causing performance of the purge operation to be resumed in the UFS device;

after the resumed purge operation has been completed, the host processor moving said one or more new commands from the WaitQ to the CQ; and the host processor performing the one or more new commands.

2. The method of claim 1, further comprising:

in the host processor, if one or more new commands other than said at least one urgent command arrive at the CQ after the purge operation is interrupted and before the resumed purge operation has been completed, delaying performance of said one or more new commands that are stored in the wait queue until the resumed purge operation has been completed.

3. The method of claim 2, wherein the host processor delays performance of said one or more new commands by storing said one or more new commands in the wait queue (WaitQ) until the resumed purge operation has been completed.

4. The method of claim 3, further comprising:

in the host processor, prior to purge operation being interrupted sending a command to the UFS device to de-assert a purge-enable flag, wherein de-assertion of the purge-enable flag causes the UFS device to interrupt the purge operation.

5. The method of claim 4, wherein the UFS device notifies the host processor that the purge operation has been interrupted by setting a purge status attribute to a first value that indicates that the purge operation has been interrupted and sending the first purge status attribute value to the host processor as part of the message to inform the host processor that the purge operation has been interrupted.

6. The method of claim 5, wherein after said at least one urgent command has been performed, the host processor causes performance of the purge operation to be resumed in the UFS device by sending a command to the UFS device to reassert the purge-enable flag, wherein reassertion of the purge-enable flag causes the UFS device to resume the purge operation.

7. The method of claim 6, further comprising:

in the UFS device, after the resumed operation has been completed, setting the purge status attribute to a second value that indicates that the resumed purge operation has been completed and sending the second purge status attribute value to the host processor to inform the host processor that the resumed purge operation has been completed.

8. The method of claim 7, further comprising:

in the host processor, after receiving the second purge status attribute value indicating that the resumed purge operation has been completed, moving said one or more new commands from the WaitQ to the CQ, retrieving said one or more new commands from the CQ and performing the one or more retrieved new commands.

9. The method of claim 1, wherein the host processor and UFS device are components of a portable computing device.

10. A system for improving security of a Universal Flash Storage (UFS) device during a purge operation that is intended to delete data stored in one or more physical blocks of flash memory of the UFS device, the system comprising:
   a UFS device comprising control logic configured to output a notification that a purge operation has been interrupted due to issuance of at least one urgent command;
   a host processor comprising a command queue, a wait queue, a plurality of registers, and processing logic configured to:
      receive and store the notification in one of the plurality of registers;
      store said at least one urgent command in the command queue (CQ) of the host processor;
      when one or more new commands other than said at least one urgent command arrive at the CQ after the purge operation is interrupted and before the purge operation is resumed, storing said one or more new commands in the wait queue (WaitQ);
      perform said at least one urgent command;
      after said at least one urgent command has been performed, cause performance of the purge operation to be resumed in the UFS device;
      after the resumed purge operation has been completed, move said one or more new commands from the WaitQ to the CQ; and
      perform the one or more new commands with the host processor.

11. The system of claim 10, wherein the processing logic of the host processor is further configured to:
   prior to purge operation being interrupted, send a command to the UFS device to de-assert a purge-enable flag, wherein de-assertion of the purge-enable flag causes the UFS device to interrupt the purge operation.

12. The system of claim 11, wherein the control logic of UFS device is configured to output the notification to the host processor that the purge operation has been interrupted by setting a purge status attribute to a first value that indicates that the purge operation has been interrupted and by sending the first purge status attribute value to the host processor to inform the host processor that the purge operation has been interrupted.

13. The system of claim 12, wherein the processing logic of the host processor is configured to cause performance of the purge operation to be resumed in the UFS device by sending a command to the UFS device to reassert the purge-enable flag, wherein reassertion of the purge-enable flag causes the UFS device to resume the purge operation.

14. The system of claim 13, wherein the control logic of the UFS device is further configured to:
   after the resumed purge operation has been completed, set the purge status attribute to a second value that indicates that the resumed purge operation has been completed; and
   send the second purge status attribute value to the host processor to inform the host processor that the resumed purge operation has been completed.

15. The system of claim 14, wherein the processing logic of the host processor is further configured to:
   move said one or more new commands from the WaitQ to the CQ in response to receiving the second purge status attribute value indicating that the resumed purge operation has been completed.

16. The system of claim 10, wherein the host processor and UFS device are components of a portable computing device.

17. A computer program embodied on a non-transitory computer-readable medium for execution by a processor for improving security of a Universal Flash Storage (UFS) device during a purge operation that is intended to delete data stored in one or more physical blocks of flash memory of the UFS device, the computer program comprising:
   a first set of computer instructions for execution by control logic of the UFS device for outputting a notification that a purge operation has been interrupted due to issuance of at least one urgent command; and
   a second set of computer instructions for execution by processing logic of a host processor, the host processor comprising a command queue, a wait queue, and a plurality of registers, the second set of computer instructions comprising:
      receiving and storing the notification in one of the plurality of registers;
      storing said at least one urgent command in the command queue (CQ) of the host processor;
      when one or more new commands other than said at least one urgent command arrive at the CQ after the purge operation is interrupted and before the purge operation is resumed, storing said one or more new commands in the wait queue (WaitQ);
      performing said at least one urgent command;
      after said at least one urgent command has been performed, causing performance of the purge operation to be resumed in the UFS device;
      after the resumed purge operation has been completed, moving said one or more new commands from the WaitQ to the CQ; and
      performing the one or more new commands with the host processor.

18. The computer program of claim 17, further comprising a third set of computer instructions for execution by the processing logic of the host processor for:
   when the one or more new commands other than said at least one urgent command arrive at the CQ after the purge operation is interrupted and before the resumed purge operation has been completed, delaying performance of said one or more new commands until the resumed purge operation has been completed.

19. The computer program of claim 18, wherein the third set of computer instructions delays performance of said one or more new commands by storing said one or more new commands in the wait queue (WaitQ) until the resumed purge operation has been completed.

20. The computer program of claim 19, further comprising a fourth set of computer instructions for execution by the processing logic of the host processor for:
   prior to purge operation being interrupted, sending a command to the UFS device to de-assert a purge-enable flag, wherein de-assertion of the purge-enable flag causes the UFS device to interrupt the purge operation.

21. The computer program of claim 20, wherein the first set of computer instructions for execution by the control logic of the UFS device outputs the notification to the host processor that the purge operation has been interrupted by setting a purge status attribute to a first value that indicates that the purge operation has been interrupted and by sending the first purge status attribute value to the host processor to inform the host processor that the purge operation has been interrupted.

22. The computer program of claim 21, wherein the second set of computer instructions causes performance of the purge operation to be resumed in the UFS device by sending a command to the UFS device to reassert the purge-enable flag, wherein reassertion of the purge-enable flag causes the UFS device to resume the purge operation.

23. The computer program of claim 22, further comprising a fifth set of computer instructions for execution by the control logic of the UFS device for:
  after the second set of computer instructions has been completed and the resumed purge operation has been completed, setting the purge status attribute to a second value that indicates that the resumed purge operation has been completed; and
  sending the second purge status attribute value to the host processor to inform the host processor that the resumed purge operation has been completed.

24. The computer program of claim 23, further comprising a sixth set of computer instructions for execution by the processing logic of the host processor for:
  receiving the second purge status attribute value indicating that the resumed purge operation has been completed; and
  moving said one or more new commands from the WaitQ to the CQ in response to receiving the second purge status attribute value indicating that the resumed purge operation has been completed.

* * * * *